(No Model.)
J. H. BENNEY.
DINNER PAIL.
No. 453,957. Patented June 9, 1891.
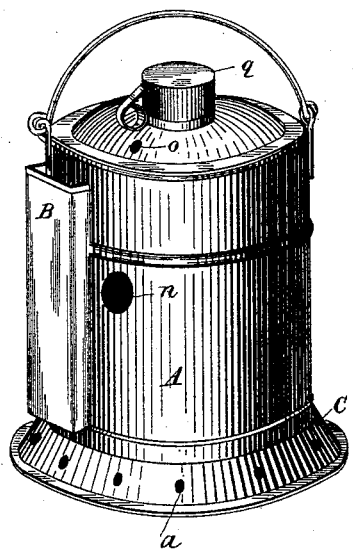
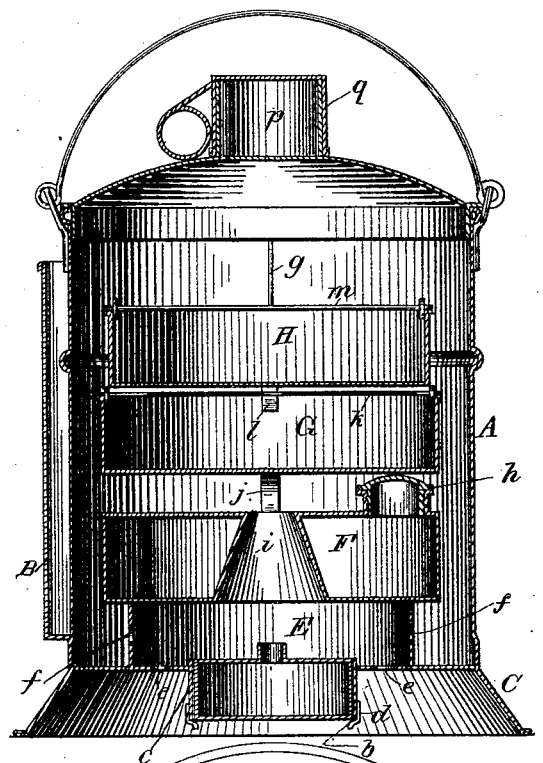
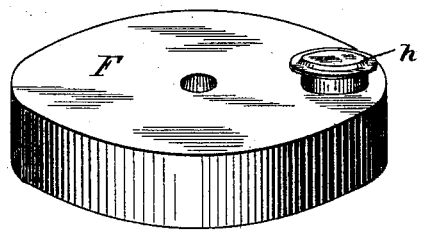
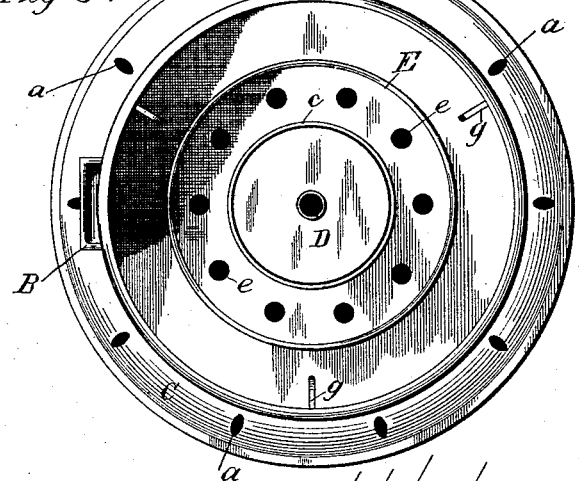
WITNESSES
Arthur A. Erb.
L. H. Dyer
INVENTOR
John H. Benney
by Frank L. Dyer
Attorney

UNITED STATES PATENT OFFICE.

JOHN H. BENNEY, OF EVANSVILLE, WISCONSIN.

DINNER-PAIL.

SPECIFICATION forming part of Letters Patent No. 453,957, dated June 9, 1891.

Application filed September 10, 1890. Serial No. 364,570. (No model.)

*To all whom it may concern:*

Be it known that I, JOHN H. BENNEY, a citizen of the United States, residing at Evansville, in the county of Rock and State of Wisconsin, have invented certain new and useful Improvements in Dinner-Pails; and I do hereby declare the following to be a full, clear, and exact description of the invention, which will enable others skilled in the art to which it appertains to make and use the same.

My invention relates to various new and useful improvements in dinner-pails.

The principal objects of my invention are to provide and produce a dinner-pail wherein a certain portion of the contents may be readily and quickly heated while the remaining portion will be unaffected by the heat, and wherein there can be no possibility of condensation occurring within the pail, so that the food will not be affected thereby.

For a better comprehension of my invention attention is invited to the accompanying drawings, forming a part of this specification, and wherein corresponding parts are designated by the same letters of reference.

In the drawings, Figure 1 is a perspective view of my improved dinner-pail; Fig. 2, a sectional view of the same; Fig. 3, an interior view, looking down from the top, with the various trays removed; and Fig. 4, a perspective view of the receptacle for coffee, tea, &c.

A represents the main casing of the dinner-pail, which is made preferably of sheet-tin. This outer casing may be made either circular, oval-shaped, or rectangular in section to suit the taste, but the first-mentioned form is preferable. This casing is provided on its side with a rectangular sheath B, for holding the knife, fork, and spoon.

The bottom of the pail or casing A is flared outwardly at C, as shown, and this portion is provided with a number of small openings $a$ $a$ $a$, in order to allow air to pass to the under side of the pail for the purpose to be explained hereinafter.

The bottom of the pail A is provided with a large central opening $b$ therein. Surrounding this opening and extending entirely around the periphery of the same is a downwardly-depending flange $c$. Extending up into the space formed within this flange is a small lamp D of a size and shape to allow it to fit snugly in position. This lamp is held in place by means of two or more leaf-springs $d$, having bends in their ends which engage beneath the same. Arranged within the interior of the pail, about midway between the flange $c$ and the outer wall, is another flange E, secured to the bottom of the pail and extending upwardly. A row of small holes $e$ is formed in the bottom of the pail between the two flanges. A number of holes $f$ are formed in the flange E. A receptacle F, for coffee, tea, &c., is placed within the pail so as to rest on the flange E directly over the lamp. This receptacle is kept from moving laterally by means of three or more spring-wires $g$, which extend vertically up and down within the interior of the pail and are secured to the inside thereof. The receptacle F is provided with a screw-cap $h$, through which it may be filled. This receptacle is also provided at its center with a conical-shaped flue $i$, extending up through the same and arranged directly above the lamp. Arranged directly above the receptacle F is a tray G, which is held from moving laterally by the before-mentioned spring-wires $g$. This tray G is provided with three or more feet or standards $j$ $j$, which rest on top of the receptacle F, and with a bail or handle $k$, by which the tray G may be removed from the pail. Another tray H is adapted to fit within the pail. This tray H is of somewhat smaller diameter than tray G and is provided with three or more standards $l$ $l$. Each standard is provided with a bent-end portion which is adapted to fit over the rim of tray G, as shown, so that the two will fit very snugly together. The tray H is also provided with a bail or handle $m$, by which it may be removed.

I form within the wall of the pail one or more openings $n$, which are directly in line with the bottom of the tray G. Each of these openings $n$ is preferably covered with fine-mesh screen to exclude flies, &c. The cover of the pail is provided with a number of corresponding openings $o$ $o$ $o$, which are also to be covered with a screen of some sort. The cover is provided with a cylindrical flange $p$, extending upwardly. Fitting over this flange $p$ is a cup $q$, made of tin and provided with a handle.

No particular construction has been assigned to the lamp D, since that is an immaterial matter; but it is preferable that the lamp should burn some sort of spirits, such as alcohol, for the sake of safety and to prevent the formation of soot within the pail. The lower tray G is intended to hold meats and vegetables or any substance which is to be heated.

The upper tray H is intended to hold pie, cake, bread, or any substance which is intended to be eaten cold. The space formed by the flange $p$ is for the purpose of holding sauce and such like substances.

From the description I have just given it will be seen that the operation of my device will be as follows: The lamp is lighted and the heat therefrom will pass into the chamber formed by the flange E and will pass up through the flue $i$. Since the bottom and the large radiating-surface of the flue $i$ will be subject to the direct action of the lamp, the contents of the receptacle F will be quickly heated. From the flue $i$ the products of combustion pass up and strike against the bottom of the tray G, so as to heat the contents of the same. The heat from the lamp will now pass out through the openings $n$ into the atmosphere. Should all the heat fail to escape through the openings $n$, it will pass up on the sides of the tray and will escape through the openings $o$. Owing to the fact that the tray H is of smaller diameter than the tray G, it will not be heated and the contents of the same will remain moderately cool. It often happens that when warm food is put in a dinner-pail the steam therefrom will condense on the interior of the pail and will affect the food therein. In my improved pail any steam from the food will be carried off through the openings $o$ $o$.

The entire device is to be carried by an ordinary handle or bail, and when constructed as I have described forms a very efficient, useful, and salable article of manufacture.

I do not wish to be limited to the particular number of ventilators or to the particular number of trays I have described.

Having now described my invention, what I claim as new therein, and desire to secure by Letters Patent, is as follows:

As a new article of manufacture, an improved dinner-pail consisting of a casing A, a lamp at the bottom of same held in place by a spring, a flange E within the casing so as to form a chamber around the lamp, a receptacle for liquids resting on said flange and provided with a conical-shaped flue therein, a number of trays above said receptacle, spring-wires $g$ for the purpose mentioned, ventilators in the pail and in the cover, a flange $p$ on the cover, and a cup $q$, substantially as set forth.

JOHN H. BENNEY.

In presence of—
J. H. HOSKINS,
A. S. BAKER.